Jan. 26, 1971  R. VANDEWALLE  3,557,538
KNIFE SECTION FOR AGRICULTURAL MOWERS AND METHOD OF
FABRICATION OF SAID KNIFE SECTION
Filed Nov. 12, 1968
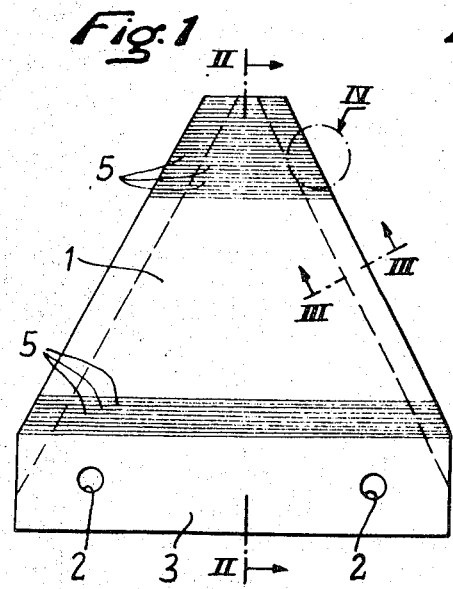
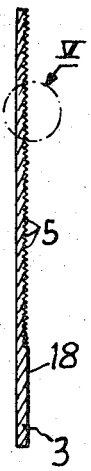
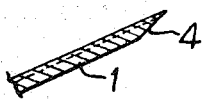
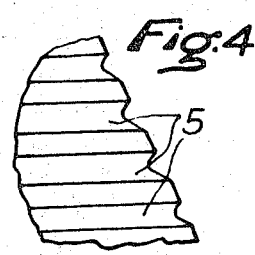
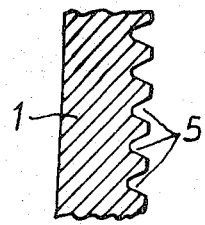
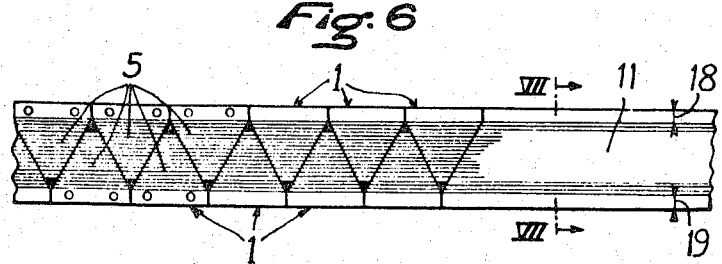
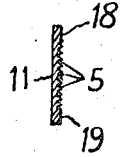
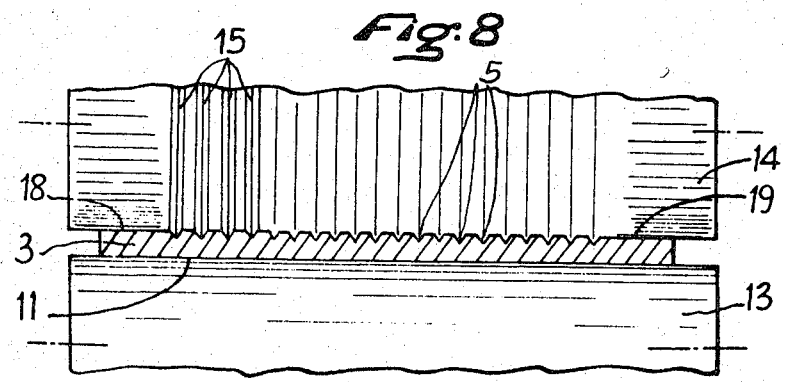
INVENTOR
Roger Vandewalle
By John J. Kowalik
ATT'Y United States Patent Office 3,557,538
Patented Jan. 26, 1971

3,557,538
KNIFE SECTION FOR AGRICULTURAL MOWERS AND METHOD OF FABRICATION OF SAID KNIFE SECTION
Roger Vandewalle, Flers-les-Lille, France, assignor to International Harvester Company, Chicago, Ill., a corporation of Delaware
Filed Nov. 12, 1968, Ser. No. 774,831
Int. Cl. A01d 55/02
U.S. Cl. 56—299                           3 Claims

ABSTRACT OF THE DISCLOSURE

A triangular shaped knife section having under-serrations formed parallel to the base of the section and extending from edge to edge of the side edges of the section to provide extensive areas for re-grinding to obtain a long lived sharpenable knife section.

This invention relates to a knife section for cutter bars of agricultural mowers, wherein said knife section has a general shape which is substantially that of an isoceles triangle and is of the so-called under-serrated type, namely in which the underface of the knife or knife section is provided with grooves which are formed parallel to the base of the aforesaid triangle in order to enhance the cutting action and permit re-grinding at less frequent intervals.

As a rule, the grooves have a depth of $3/10$ to $4/10$ of a millimeter and are spaced at a distance of approximately 1.2 millimeter. Up to the present time, said grooves have extended only over a distance of approximately 1 centimeter from the cutting edges of the knife section on account of the methods of fabrication of knives which have hitherto been adopted, as will be explained hereinafter.

In point of fact, since the said grooves have a relatively short length of approximately 1 centimeter, they eventually disappear after a certain number of re-grinding operations, which is clearly a drawback.

The aim of the present invention is to provide an under-serrated cutter-bar knife section which is not subject to the above-mentioned disadvantage of conventional knives.

To this end, the mower or cutter-bar knife section in accordance with the invention is provided with under-serration grooves which extend over the entire width of the knife section from one cutting edge to the other.

Under these conditions, it is readily apparent that the knife sections can be re-ground as many times as may be desired, and as may prove compatible with the requisite conditions of working stress and strength.

Moreover, the conventional operation of under-serration of mower knives is usually performed by means of a machine of the same type as those employed for cutting files, so that the grooves are obtained by striking the surface with a mechanically operated chisel, said chisel being carried by a sliding carriage, the feed of said carriage being such as to correspond to the spacing of the grooves as a function of the rate of striking of the chisel.

However, the above-mentioned method is subject to disadvantages. In fact, the chisel becomes rapidly blunted in contact with the workpiece and this latter becomes deformed during the heat treatment operation on account of the elongation of the metal caused by the under-serrating operation which produces stresses on only one of the two faces of the knife.

The invention is also directed to a method of fabrication of mower knives of the novel type hereinabove defined which is not subject to the drawbacks of the conventional method outlined above and which, in addition, is faster.

The method in accordance with the invention consists in cutting out knife sections transversely from a strip of rolled steel and preferably in top-to-base relation in order to avoid wastage of metal, after completion of a final cold-rolling pass between a smooth roll and a roll on which are formed annular beads having a profile which is complementary to that of the grooves to be obtained.

By virtue of this process, there no longer arises the disadvantage of rapid blunting of the chisel as in the conventional process and parts are not deformed during heat treatment since they have not been subjected to repeated stresses on only one face of the part for the purpose of forming under-serration grooves.

Furthermore, the conventional method of under-serration by means of a chisel has the additional disadvantage of producing a displacement of metal with respect to the face of the workpiece and this excess metal is thus super-elevated throughout the serrated zone, thereby entailing an additional surface grinding operation in order to trim the projecting portions.

In one mode of operation in accordance with the invention, the above-mentioned disadvantage is circumvented. To this end, the grooves are formed in the steel strip from which the knife sections are to be cut and only between the marginal portions of said strip. Thus, the summits or lands of the under-serration grooves are therefore located in the same plane as the top face of the base of the knife section and it is not necessary to carry out the usual surface grinding operation in order to trim the projecting portions of the grooves obtained by means of a chisel.

The under-serrated knife section in accordance with the invention is therefore distinguished not only by the fact that its under-serration grooves extend over the entire width of the knife section from one cutting edge of this latter to the other but also by the fact that it has a smooth base, the surface of which is located in the same plane as that of the untreated lands corresponding to the grooves of the under-serrated portion whereas, in the conventional process, said lands were blunted as a result of the trimming operation which was necessary in order to true the entire top face of the knife section.

A better understanding of the invention will be gained from a perusal of the following description and from a study of the accompanying drawings which show by way of non-limitative example one form of construction of a mower knife in accordance with the invention and which provide an explanatory illustration of the method of manufacture of the knife.

In these drawings:

FIG. 1 is a plan view of one knife section according to the invention for the cutter bar of an agricultural mower;

FIG. 2 is a sectional view taken along the line II—II of FIG. 1;

FIG. 3 is a fragmentary sectional view taken along the line III—III of FIG. 1;

FIG. 4 is a highly enlarged view showing the detail of FIG. 2 which is comprised within the circuit designated by the reference IV;

FIG. 5 is also a greatly enlarged view showing the detail of FIG. 2 which is comprised within the circle designated by the reference V;

FIG. 6 shows a steel strip from which knife sections in accordance with the invention are to be cut;

FIG. 7 is a sectional view taken along the line VII—VII of FIG. 6, and

FIG. 8 illustrates the opeartion which consists in forming grooves in the steel strip.

The mower knife section which is shown in FIGS. 1 and 2 and generally designated by the reference 1 has a general shape which is substantially that of an isosceles triangle having a truncated apex and a base which is provided with fixing means actually consisting of two holes 2. The two sides of the knife section are chamfered as shown at 4 in FIG. 3. The underface of the knife section, namely the face shown in FIG. 1, is provided with transverse grooves 5 which extend over the entire width of the knife section from one cutting edge to the other except in the portion 3 which serves to attach the knife section. The lands corresponding to said grooves are located in the same geometrical plane as the plane of the underface of the base 3 of the knife section. FIG. 5 shows on a larger scale the profile of these under-serration grooves whilst FIG. 4 shows the appearance of the cutting edge in the under-serrated portion of the knife section when looking on the underface of this latter.

FIG. 6 serves to illustrate one method of fabrication of the under-serrated knife section of FIGS. 1 to 5. This method consists in cutting the knife sections 1 from a rolled steel strip 11 across this latter and preferably in top-to-base relation in order to avoid wastage of metal. Said steel strip has previously been subjected to a final cold-rolling pass between a smooth roll 13 (as shown in FIG. 8) and a roll 14 provided with annular beads 15 having a profile which is complementary to that of the under-serration grooves 5 to be obtained. The annular beads 15 extend over the roll 14 only over a length of said cylinder which corresponds to the width of that portion of the steel strip 11 which is located between the two marginal portions 18 and 19 of this latter which are intended to form the bases of the knife sections and which are therefore not intended to be provided with under-serration grooves. The roll 14 is of uniform diameter over its entire length and the beads 15 project from said roll, with the result that the underface 18 of the base 3 of each knife section is located in the same plane as the lands of the under-serration grooves.

As is readily understood, the invention is not limited to the form of execution and mode of operation which are illustrated and given by way of example. Modifications can be contemplated without thereby departing from the scope or the spirit of the invention.

What I claim is:

1. A generally triangular-shaped knife section for cutter bars of mowers comprising a pair of forwardly converging side edges and a transverse rear edge, said section having a base with a plurality of lands of equal depth extending from one side edge to the other parallel with the rear edge and defining a plurality of continuous grooves therebetween parallel with the rear edge, said lands having entire bottom surfaces located in a common plane, said section having a flat top side, and a chamfer along each side edge extending from said top side to each side edge providing a cutting edge, said lands and grooves providing serrations at said side edges and said grooves being of substantially uniform depth throughout the width of the section.

2. A generally triangular-shaped knife section for cutter bars of mower comprising a pair of forwardly converging side edges and a transverse rear edge, said section having top and bottom sides, said top side being flat and said bottom side having a plurality of uniformly spaced grooves extending parallel with the rear edge from one side edge to the other, and a chamfer on each side edge.

3. A generally triangular-shaped knife section for a cutter bar of a mower comprising forwardly converging sharpened side edges and a transverse rear edge, said section having top and bottom sides, said bottom side having a plurality of closely spaced grooves and intervening lands extending parallel with the rear edge from one side edge to the other and forming serrations at said side edges.

References Cited

UNITED STATES PATENTS

| | | | |
|---|---|---|---|
| 42,644 | 5/1864 | Davis | 56—299 |
| 54,446 | 5/1866 | Utley | 56—299 |
| 513,834 | 1/1894 | Smith | 56—296 |
| 913,207 | 2/1909 | Grah | 56—299X |

FOREIGN PATENTS

| | | |
|---|---|---|
| 221,144 | 4/1910 | Germany. |
| 209,890 | 5/1966 | Sweden. |

LOUIS G. MANCENE, Primary Examiner

J. N. ESKOVITZ, Assistant Examiner